US010428495B2

(12) United States Patent
Halimi (10) Patent No.: US 10,428,495 B2
(45) Date of Patent: Oct. 1, 2019

(54) SIMPLIFIED LEAK DETECTION IN A PLUMBING SYSTEM USING PRESSURE DECAY PRINCIPLE

(71) Applicant: Flo Technologies, Inc., Los Angeles, CA (US)

(72) Inventor: Henry M. Halimi, Los Angeles, CA (US)

(73) Assignee: FLO TECHNOLOGIES, INC., Los Angeles, CA (US)

(*) Notice: Subject to any disclaimer, the term of this patent is extended or adjusted under 35 U.S.C. 154(b) by 5 days.

(21) Appl. No.: 15/356,613

(22) Filed: Nov. 20, 2016

(65) Prior Publication Data
US 2017/0159267 A1    Jun. 8, 2017

Related U.S. Application Data

(60) Provisional application No. 62/258,435, filed on Nov. 21, 2015.

(51) Int. Cl.
| | | |
|---|---|---|
| *E03B 7/00* | (2006.01) | |
| *E03B 7/07* | (2006.01) | |
| *G01L 19/00* | (2006.01) | |
| *G01M 3/26* | (2006.01) | |
| *G01M 3/32* | (2006.01) | |

(52) U.S. Cl.
CPC .............. *E03B 7/003* (2013.01); *E03B 7/071* (2013.01); *G01L 19/0092* (2013.01); *G01M 3/26* (2013.01); *G01M 3/3272* (2013.01); *Y02A 20/15* (2018.01)

(58) Field of Classification Search
CPC ....... E07B 7/003; G01M 3/28; G01M 3/2807; G01M 3/2876
See application file for complete search history.

(56) References Cited

U.S. PATENT DOCUMENTS

| 5,158,483 A | 10/1992 | Fishman et al. | |
|---|---|---|---|
| 6,161,568 A * | 12/2000 | Dragotta ................. | E03C 1/025 137/148 |

(Continued)

*Primary Examiner* — Marina A Tietjen
*Assistant Examiner* — Paul J Gray
(74) *Attorney, Agent, or Firm* — Hackler Daghighian Martino & Novak (57) ABSTRACT

A water pressure sensor assembly includes a water connection fitting attached to a housing, where the water connection fitting is configured to attach to a point of use in a plumbing system. A pressure sensor and an optional temperature sensor are disposed within the housing and configured to be in fluidic communication with the point of use in the plumbing system. Another temperature sensor measures the surrounding air temperature. An electronic microprocessor is disposed within the housing and in electrical communication with the pressure sensor and the temperature sensors. A power source is in electrical communication with the electronic microprocessor. A data transmission path is in electrical communication with the electronic microprocessor. A control device is in electrical communication with the electronic microprocessor through the data transmission path, the control device including a visual display and at least one user control configured to control the water pressure sensor assembly.

28 Claims, 5 Drawing Sheets

(56) References Cited

U.S. PATENT DOCUMENTS

| | | | | |
|---|---|---|---|---|
| 6,209,576 | B1* | 4/2001 | Davis | E03B 7/071 |
| | | | | 137/460 |
| 8,857,466 | B1* | 10/2014 | Wilson | E03B 7/071 |
| | | | | 137/551 |
| 2006/0202051 | A1 | 9/2006 | Parsons et al. | |
| 2007/0068225 | A1* | 3/2007 | Brown | F16K 37/0075 |
| | | | | 73/40.5 A |
| 2007/0289635 | A1 | 12/2007 | Ghazarian et al. | |
| 2008/0300803 | A1 | 12/2008 | Drake et al. | |
| 2010/0212748 | A1* | 8/2010 | Davidoff | F17D 5/02 |
| | | | | 137/10 |
| 2011/0114202 | A1 | 5/2011 | Goseco | |
| 2011/0178644 | A1 | 7/2011 | Picton | |
| 2013/0036796 | A1* | 2/2013 | Fleury, Jr. | G01M 3/00 |
| | | | | 73/40.5 R |
| 2013/0306157 | A1* | 11/2013 | Aylon | E03B 7/07 |
| | | | | 137/1 |
| 2014/0230924 | A1* | 8/2014 | Kochan, Jr. | F16K 37/005 |
| | | | | 137/487.5 |
| 2014/0230925 | A1 | 8/2014 | Halimi | |
| 2014/0306828 | A1* | 10/2014 | Trescott | E03B 7/003 |
| | | | | 340/605 |
| 2015/0348395 | A1* | 12/2015 | Trout | G08B 21/20 |
| | | | | 340/605 |

\* cited by examiner

SIMPLIFIED LEAK DETECTION IN A PLUMBING SYSTEM USING PRESSURE DECAY PRINCIPLE

CROSS-REFERENCE TO RELATED APPLICATIONS

This application claims priority to provisional application 62/258,435 filed on Nov. 21, 2015, the entire contents of which are fully incorporated herein with these references.

DESCRIPTION

Field of the Invention

The present invention generally relates to leak detection in plumbing systems. More particularly, the present invention relates to a simplified device that can easily be installed and removed in a plumbing system for then utilizing the pressure decay principle for leak detection.

Background of the Invention

Water is a precious resource and vital to all life, but can cause catastrophic damage to homes and buildings if it is not properly monitored or controlled. Any plumbing system that contains and distributes pressurized water is subject to leaks. Some of these leaks are visible and some are in places that are not noticeable such as behind the wall leaks, underground leaks, leaky toilet flappers and the like.

In any plumbing system the network of pressurized pipes behind the wall are subject to decay and cannot be easily maintained. Unless these types of leaks are proactively detected, they first become noticeable when water manifests itself in the form of water stained patches on walls or ceilings that eventually will result in catastrophic failure and/or costly mold remediation.

Accordingly, there is a need for an improved method for leak detection that can easily be administered, thereby finding leaks quicker and preventing costly damage. The present invention fulfills these needs and provides other related advantages.

SUMMARY OF THE INVENTION

The present invention utilizes the pressure decay principals of fluid mechanics by monitoring the pressure in an isolated pressurized system. Once pressure is built up, pressure decays if there is leak in a plumbing system much the same way that a playing ball loses pressure when it is punctured, or how a vehicle tire losses pressure if there is a leak after it has been filled.

There are a number of options available for leak detection in plumbing systems that requires permanent placement of a pressure monitoring device in line by cutting a water line and installing such devices. This is costly and requires professional installation. The present invention achieves the same objectives with minimal expense and use of a non-permanent and detachable device that can be easily re-used for other tests and leak detection. For example, a plumbing professional can take this device to every house or building he/she is called to and test for leaks in the system.

The present invention has many advantages to list a few: (1) it is simple to use and can be installed and operated by an individual that does not have technical training (i.e. "do it yourself" by an average user); (2) does not require any permanent alteration to the plumbing system; (3) does not need professional installation; (4) can reasonably predict the type and the magnitude of the leak.

Through the use of the present invention, system tests are performed based on the principal of pressure decay by monitoring and testing pressure decay in a closed system. Proprietary algorithms used in the present invention can inform the user that a leak exists and guide the user in the magnitude and possible kind and source of leak.

As an example, an embodiment of a water pressure sensor assembly, includes: a water connection fitting attached to a housing, the water connection fitting configured to attach to a point of use in a plumbing system; a pressure sensor disposed within the housing and configured to be in fluidic communication with the point of use in the plumbing system; an optional temperature sensor disposed within the housing and configured to be in fluidic communication with the point of use in the plumbing system; an electronic microprocessor disposed within the housing and in electrical communication with the pressure sensor and the temperature sensor; a power source in electrical communication with the electronic microprocessor; a data transmission path in electrical communication with the electronic microprocessor; a control device in electrical communication with the electronic microprocessor through the data transmission path, the control device comprising a visual display and at least one user control configured to control the water pressure sensor assembly.

In another further variation the data transmission path may be a wireless transmitter and receiver configured to transmit data from the electronic microprocessor to the control device and configured to send a user command from the at least one user control back to the microprocessor which then controls the water pressure sensor assembly.

In another further variation the control device may comprise a wireless smart phone, a wireless tablet or a wireless laptop computer, and wherein the control device may be configured to install and run a water pressure sensor assembly software which is associated with the water pressure sensor assembly.

In another further variation the data transmission path may be hard wired to connect physically between the housing and the control device and transmit data from the electronic microprocessor to the control device and configured to send a user command from the at least one user control back to the microprocessor which then controls the water pressure sensor assembly.

In another further variation the control device may comprise a smart phone, a tablet or a laptop computer, and wherein the control device may be configured to install and run a water pressure sensor assembly software which is associated with the water pressure sensor assembly.

In another further variation the control device may be attached to or integrated into the housing.

In another further variation the power source may comprise an internal battery disposed within the housing.

In another further variation the power source may comprise an electrical plug attached to the housing, the electrical plug configured to connect to an electrical outlet.

In another further variation the water connection fitting may comprise a female-side hose tap fitting.

In another further variation the water connection fitting may comprise a male-side faucet tap fitting.

In another further variation the water connection fitting may removably attach to an opposite end of a female-side hose tap fitting and to an opposite end of a male-side faucet tap fitting.

In another further variation the water connection fitting may removably attach to an opposite end of a universal water tap fitting.

In another further variation the point of use of the plumbing system may comprise a hose tap, a faucet tap or a shower tap.

In another further variation it may include an output jack connected to the housing, the output jack in electrical communication with the electrical microprocessor and configured to connect to a test equipment.

In another further variation it may include a motorized shut-off valve configured to be installed in the plumbing system, where the motorized shut-off valve is in electrical communication with the control device.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

In the present invention, a pressure sensor is connected and exposed to water pressure at any point of use in a plumbing system. The plumbing system can be a residential dwelling, a commercial building or any part of a pressurized water system that can be isolated. The water pressure in the plumbing system is now able to be transmitted/sent to an electronic processor that can monitor and analyze the pressure signal. The plumbing system is then isolated by shutting off the upstream supply valve to the plumbing system that is undergoing the test. This marks the start of the test. From this point the occupants are instructed not to use water for the duration of the test, which is normally a few minutes and does not take a substantially long time. Simultaneously with shutting off the upstream supply valve, the present invention's electronic microprocessor is triggered (automatically or by the user) via wireless or wired remote control device to record the initial system pressure and to continue monitoring the water pressure in close intervals. Over time, either the water pressure will remain constant or the water pressure will decay, meaning it will be losing pressure. In the event that the water pressure is staying constant, this indicates there is not a leak in that particular test section of fluid piping. In the event that a pressure loss is detected, the electronic microprocessor executes proprietary algorithms based on the amount of pressure lost, time lapse from the start of the test, a pre-defined ratios of the initial pressure and other factors. The present invention then reports the plumbing system status and makes suggestions on the possible type(s) and source(s) of leak that could have caused the pressure decay during the test, and assists in troubleshooting. As can be appreciated, this information will confirm a leak in the system and will assist in locating the leak.

In the prior art performing these tests were very hard to do, as a pressure sensor was physically and permanently installed into the plumbing the system. The present invention has greatly simplified this by understanding that an existing point of use of the plumbing system could be used to connect to the present invention. For example, most homes have a hose tap that resides generally in the back yard. The present invention is configured to easily attach to this hose tap. Most homes also have an upstream water shut-off valve usually located in the garage or outside the front the house. The shut-off valve allows the home owner to shut off the water supply such that various maintenance or fixes could be made to the plumbing system. The user could easily locate and shut off the water at the shut-off valve such that the pressure decay test could be performed with the present invention.

The present invention can be configured to attach to more than just the hose tap. For example, the present invention can be configured to attach to any other easily accessible plumbing fixture in a building or housing, such as faucet taps, shower taps, even toilets, tubs and any other accessible point of use fixtures. As can be seen, the present invention can quickly be connected to the plumbing system to perform the pressure decay test to quickly identify if a leak is present in the system.

Figure 1:
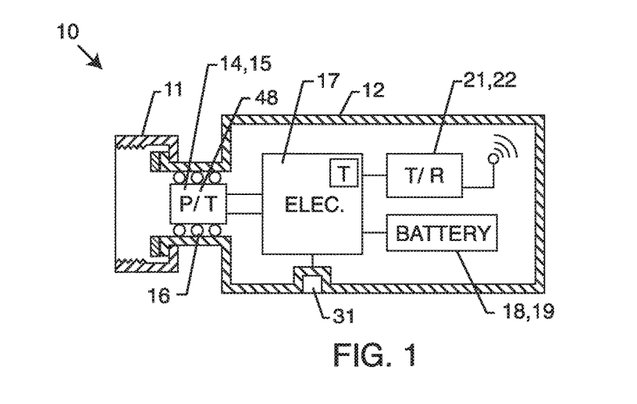
FIG. 1 is a partial sectional and partial schematic side view showing one embodiment of the present invention.

FIG. 1 is a partial sectional and partial schematic side view showing one embodiment of a water pressure sensor assembly 10. The water pressure sensor assembly 10 includes a water connection fitting 11 attached to a housing 12. The water connection fitting 11 is configured to attach to a point of use 13 in a plumbing system. A pressure sensor 14 is disposed within the housing 12 and is configured to be in fluidic communication with the point of use in the plumbing system. An optional temperature sensor 15 is disposed within the housing 12 and is also configured to be in fluidic communication with the point of use in the plumbing system. As can be seen in FIG. 1, various water seals 16 prevent water from reaching an inside of the housing 12 where other electronics and circuits will reside. It is understood by those skilled in the art that a variety of seals and sealing techniques could be utilized.

An electronic microprocessor 17 is disposed within the housing 12 and is in electrical communication with the pressure sensor 14 and the optional temperature sensor 15. It is understood by those skilled in the art that the microprocessor can also be a micro controller, a processor or any other electronic processing means as the term microprocessor is not intended to limit the present to a particular type of electronic processing means. A power source 18 is in electrical communication with the electronic microprocessor. As shown here in FIG. 1, the power source 18 is an internal battery 19.

The optional temperature sensor 15 is in direct contact with the water and can be used to detect if the water system is getting close to a freezing condition, which could then send a warning signal. Furthermore, another temperature sensor 48 could be integrated into or connected to the microprocessor 17 that is then configured to monitor the surrounding temperature. Knowing the surrounding (environmental) temperature from the temperature sensor 48 allows the present invention to then use this information for performing various proprietary temperature compensation algorithms that the inventors have developed.

Figure 2:
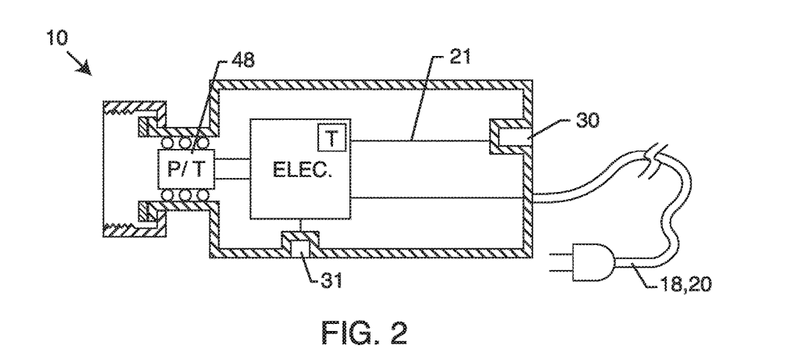
FIG. 2 is a partial sectional and partial schematic side view showing another embodiment of the present invention

FIG. 2 is a partial sectional and partial schematic side view showing another embodiment of the present invention. As shown in FIG. 2, the power source 18 is an electrical plug 20. It will be understood that either the battery, electrical plug or both could be utilized to power the present invention.

Figure 3:
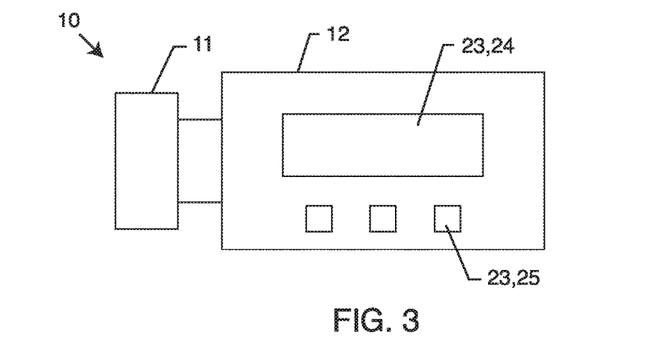
FIG. 3 is a side view of another embodiment of the present invention.

As shown in FIG. 1, a data transmission path 21 is in electrical communication with the electronic microprocessor. The data transmission path 21 may be a wireless transmitter and receiver 22 configured to transmit data from the electronic microprocessor to a control device 23. The control device 23 is in electrical communication with the electronic microprocessor through the data transmission path 21. The control device 23 comprises a visual display 24 and at least one user control 25 configured to control the water pressure sensor assembly. Skipping to FIG. 3, which shows a side view of another embodiment of the present invention, the control device 23 has been integrated into the housing 12. This would make the present invention a complete and self-contained unit. The display 24 can be an LED screen, a liquid crystal display or any other typical display used in portable electronic devices. The at least one user controls 25 are buttons which can be manipulated by the user.

Figure 8:
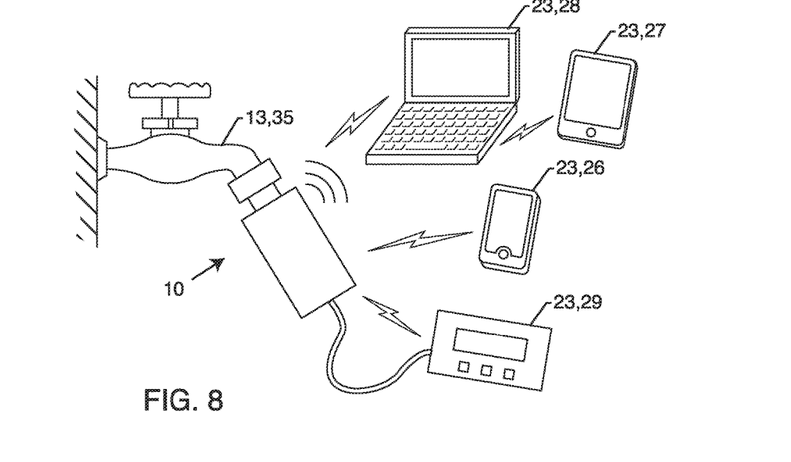
FIG. 8 is a view similar to FIG. 7 now showing both a wireless connection and a wired connection to various auxiliary control units.

Alternatively, as shown in FIG. 1, the transmitter and receiver 22 can send a wireless signal to a remotely disposed control device 23. This is best understood skipping ahead to FIG. 8, where one can see a wireless signal is sent to either a smart phone 26, a tablet 27, a laptop computer 28 or the like. Alternatively, a special dedicated remote control device 29 can also be used which can be wireless or hard wired. All of these remote control devices 23, 26, 27, 28, 29 are then configured to install and run a water pressure sensor assembly software which is associated with the water pressure sensor assembly 10. The water pressure sensor assembly software can be designed as an application for smart phones. The application could even perform the tests during off hour times or remind the user to perform tests at various intervals.

As shown in FIG. 2, the data transmission path 21 may be hard wired to connect physically between the housing 12 and the control device 23 and transmit data from the electronic microprocessor 17 to the control device 23 and configured to send a user command from the at least one user control back to the microprocessor which then controls the water pressure sensor assembly. For example, a hard wire connection port 30 may be utilized to physically connect the water pressure sensor assembly with the control device with the use of a cable/wire. As is understood, the control device could still be a specialized unit 29, or be specialized software running on the user's smart phone, tablet, laptop computer or the like.

As shown in FIGS. 1 and 2, an optional connection jack 31 can be connected to the electronic microprocessor and used to test the internal circuitry and verify the sensors are working correctly.

Figure 4:
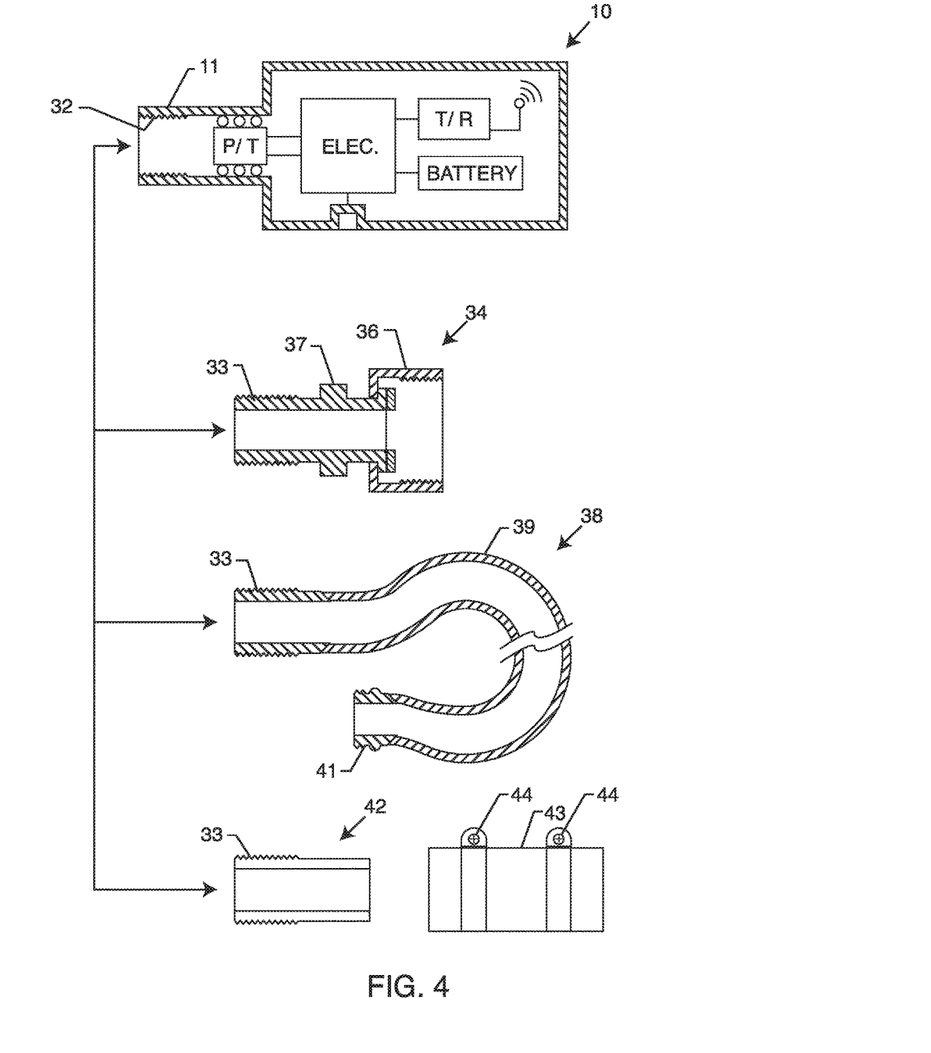
FIG. 4 is a partial sectional and partial schematic side view showing one embodiment of the present invention now having multiple fluid connections configured for different attachments to a plumbing system.
Figure 6:
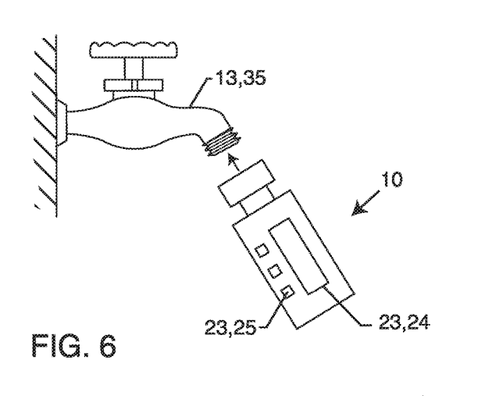
FIG. 6 is a close-up side view of the present invention about to be connected to a hose tap.
Figure 7:
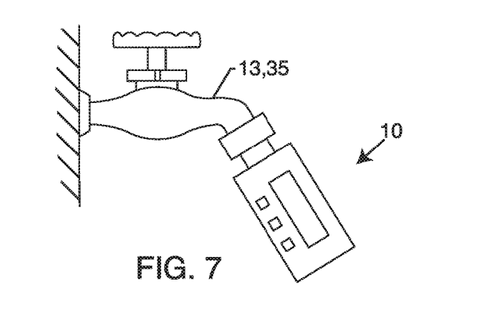
FIG. 7 is a view similar to FIG. 6 now showing the present invention connected to the hose tap.

FIG. 4 is a partial sectional and partial schematic side view showing one embodiment of the present invention now having multiple fluid connections configured for different attachments to a plumbing system. As previously discussed herein, one advantage of the present invention is that it can be coupled to a variety of point of use fixtures, such as hose taps, faucet taps and the like. As shown in FIG. 4, the water connection fitting 11 has a female end 32 which can then be coupled/connected to male end 33 of a variety of devices. (It will be understood that which end is the female end and which end is the male end can be reversed and the present invention still work the same.) A specialized hose tap fitting 34 is used to connect to the water connection fitting 11 at one end and then at the other end connect to a hose tap 35 as shown in FIGS. 6 and 7. As one can see, the hose tap fitting 34 can have an outer portion 36 that can rotate to then secure to the hose tap 35. A hex head portion 37 can aid in installation as well.

Figure 9:
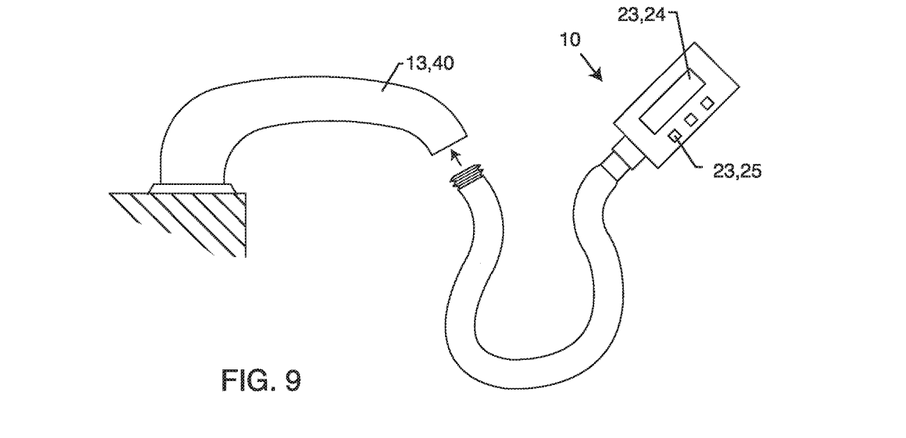
FIG. 9 is a close-up side view of the present invention about to be connected to a faucet tap.

Alternatively shown in FIG. 4, a faucet tap fitting 38 is used to connect to an existing faucet 40. The male end 33 is connected to a flexible portion 39 that then connects to the male side faucet tap fitting 41. Because sinks do not have a lot of room under the faucet itself, the flexible portion allows the user room to install and utilize the present invention, as best shown in FIG. 9.

Alternatively shown in FIG. 4, a universal fitting 42 is shown where it simply comes to an end without any threading. Then a rubber or elastomeric tube 43 can be slipped over the end of the fitting 42 and sealed with the clamp 44. Then the opposite end of the tube 43 can be clamped onto other various point of use water fixtures that might not have various threads to attach to. For example, even a shower head can be removed and the stub of the shower can be attached to the present invention. As can be seen in FIG. 4, there are a variety of ways and methods to connect the present invention to various point of use locations in a building or house. It is understood that through the present invention, it can be coupled to a variety of point of use locations be equally effective at locating leaks.

Furthermore, in some situations there may be no point of use locations that can easily be tapped into. In these circumstances, the present invention can also be attached to a saddle valve. A saddle valve is known to those skilled in the art that allows a fluid pipe to be tapped into with a manually controllable valve that requires no cutting, welding or soldering to install. Rather, installation is simple as the fluid pipe is pierced by screwing down a piercing pin that then allows access to the water flowing within the pipe.

Figure 5:
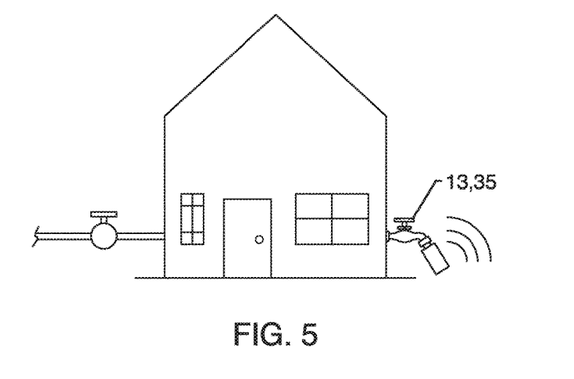
FIG. 5 is a simplified representation of how the present invention would work with a dwelling or building.
Figure 10:
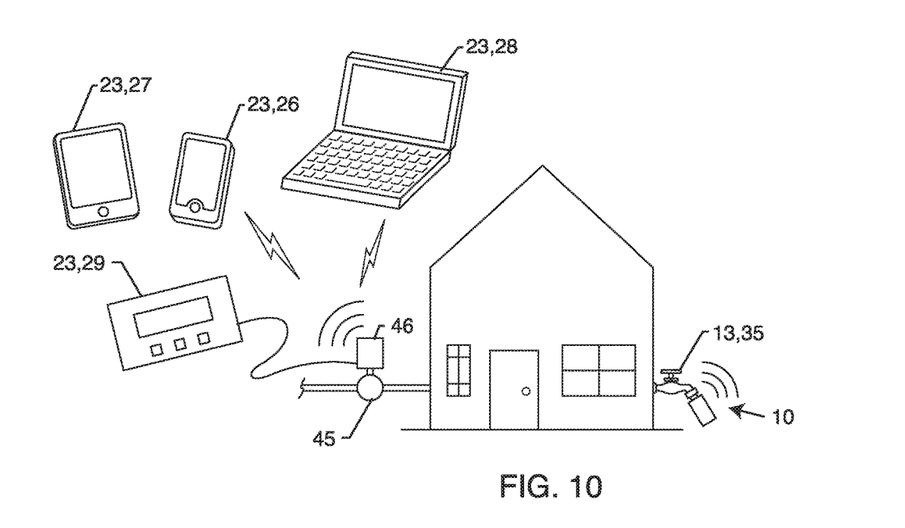
FIG. 10 is a view similar to FIG. 5 now showing a motorized valve shut off wirelessly or wired to the control unit.

As previously discussed it was taught that the user would have to manually close the shut-off valve 45 as shown in FIG. 5 to then perform the pressure decay test. FIG. 10 is a view similar to FIG. 5 now showing a motorized shut off 46 connected to the shut off valve 45. The motorized shut off 46 can be wirelessly (or hard wired) connected to the control unit 23 which is also connected to the water pressure sensor assembly 10. In this way, a user can remotely shut the water supply off and perform a pressure decay test. For example, the current specification incorporates publication U.S. 2014/0230925 A1 (application Ser. No. 14/182,213 filed Feb. 17, 2014) in its entirety by this reference.

Referring back to FIG. 3, it is understood that the user controls 25 can be an on/off switch (button) and various other selection switches (buttons). When the control device is a smart device, it is understood that these buttons 25 are already integrated into the smart devices buttons or touch screen.

Figure 11:
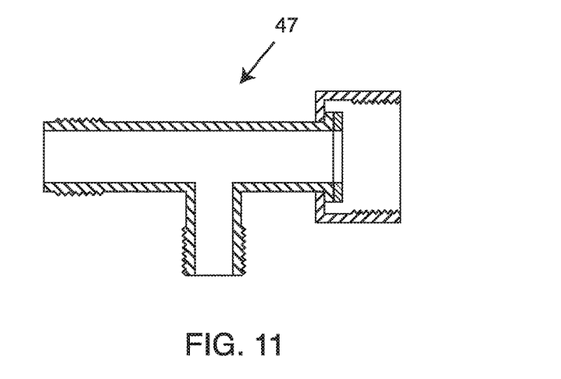
FIG. 11 is a sectional view of a T fitting used in the present invention.

In general, there are at least three types of connection to expose the pressure sensor to water pressure. (1) A terminal connection is when there is an available water outlet such as hose bib (tap) or unused stop valve for faucet, icemaker, dishwasher or toilet. The device 10 can also be connected to the outlet of a faucet. In this case the pressure sensor can be directly connected to an available terminal point using a universal connection kit. (2) However, there may not be location to connect the present invention 10 to. A non-terminal connection is when there is no available water outlet, so therefore the present invention will be connected in line with an existing fixture or appliance by inserting the provided "T" fitting 47 as shown in FIG. 11. (3) It is also possible that the present invention 10 be incorporated in a fixture of appliance. Furthermore, the present invention's water connection fitting 11 may include a valve that can be closed for testing and opened when the fixture is in use.

Although several embodiments have been described in detail for purposes of illustration, various modifications may be made to each without departing from the scope and spirit of the invention. Accordingly, the invention is not to be limited, except as by the appended claims.

NUMERALS 10 water pressure sensor assembly
11 water connection fitting
12 housing
13 point of use, plumbing system
14 pressure sensor
15 temperature sensor, water
16 seal
17 electronic microprocessor
18 power source
19 battery
20 electrical plug
21 data transmission path
22 transmitter/receiver, data transmission path
23 control device
24 display, control device
25 user control, control device
26 smart phone
27 tablet
28 laptop computer
29 remote control device
30 hard wire connection port
31 connection jack
32 female end, water connection fitting
33 male end, water connection fitting
34 hose tap fitting
35 hose tap
36 outer portion, hose tap fitting
37 hex head, hose tap fitting
38 faucet tap fitting
39 flexible portion, faucet tap fitting
40 faucet tap
41 male side faucet tap fitting.
42 universal fitting
43 elastomeric tube
44 clamp
45 shut-off valve
46 motorized shut off
47 T fitting
48 temperature sensor, surroundings

What is claimed is:

1. A water pressure sensor assembly, comprising:
a water connection fitting attached to a housing, the water connection fitting attachable to a point of use in a plumbing system;
a pressure sensor disposed within the housing and configured to be in fluidic communication with the point of use in the plumbing system;
a temperature sensor disposed within the housing and configured to be in fluidic communication with the point of use in the plumbing system;
an electronic microprocessor disposed within the housing and in electrical communication with the pressure sensor and the temperature sensor;
a power source in electrical communication with the electronic microprocessor;
a data transmission path in electrical communication with the electronic microprocessor;
a control device in electrical communication with the electronic microprocessor through the data transmission path, the control device comprising a visual display and at least one user control configured to control the water pressure sensor assembly;
wherein the water connection fitting comprises only one fluid connection for fluidic communication between the point of use in the plumbing system and the pressure sensor and the temperature sensor.

2. The water pressure sensor assembly of claim 1, wherein the data transmission path is a wireless transmitter and receiver configured to transmit data from the electronic microprocessor to the control device and configured to send a user command from the at least one user control back to the microprocessor which then controls the water pressure sensor assembly.

3. The water pressure sensor assembly of claim 2, wherein the control device comprises a wireless smart phone, a wireless tablet or a wireless laptop computer, and wherein the control device is configured to install and run a water pressure sensor assembly software which is associated with the water pressure sensor assembly.

4. The water pressure sensor assembly of claim 1, wherein the data transmission path is hard wired to connect physically between the housing and the control device and transmit data from the electronic microprocessor to the control device and configured to send a user command from the at least one user control back to the microprocessor which then controls the water pressure sensor assembly.

5. The water pressure sensor assembly of claim 4, wherein the control device comprises a smart phone, a tablet or a laptop computer, and wherein the control device is configured to install and run a water pressure sensor assembly software which is associated with the water pressure sensor assembly.

6. The water pressure sensor assembly of claim 1, including a second temperature sensor disposed within the housing and in electrical communication with the electronic microprocessor, the second temperature sensor configured determine the surrounding temperature.

7. The water pressure sensor assembly of claim 1, wherein the control device is attached to or integrated into the housing.

8. The water pressure sensor assembly of claim 1, wherein the power source comprises an internal battery disposed within the housing.

9. The water pressure sensor assembly of claim 1, wherein the power source comprises an electrical plug attached to the housing, the electrical plug configured to connect to an electrical outlet.

10. The water pressure sensor assembly of claim 1, wherein the water connection fitting comprises a female-side hose tap fitting.

11. The water pressure sensor assembly of claim 1, wherein the water connection fitting comprises a male-side faucet tap fitting.

12. The water pressure sensor assembly of claim 1, wherein the water connection fitting is removably attachable to a male-side hose tap fitting and to a female-side faucet tap fitting.

13. The water pressure sensor assembly of claim 1, wherein the water connection fitting is removably attachable to a universal water tap fitting.

14. The water pressure sensor assembly of claim 1, wherein water connection fitting is attached to the point of use of the plumbing system, wherein the point of use of the plumbing system comprises a hose tap, a faucet tap or a shower tap.

15. The water pressure sensor assembly of claim 1, including an output jack connected to the housing, the output jack in electrical communication with the electrical microprocessor and configured to connect to a test equipment.

16. The water pressure sensor assembly of claim 1, including a motorized shut-off valve configured to be installed in the plumbing system, where the motorized shut-off valve is in electrical communication with the control device.

17. The water pressure sensor assembly of claim 1, wherein the water connection fitting comprises a female-side fitting or a male-side fitting.

18. The water pressure sensor assembly of claim 1, including a flexible portion configured to attach between the water connection fitting and the point of use in the plumbing system.

19. The water pressure sensor assembly of claim 1, wherein the housing does not include a fluid valve in fluidic communication with the water connection fitting.

20. A water pressure sensor assembly, comprising:
a water connection fitting attached to a housing, the water connection fitting attachable to a point of use in a plumbing system, wherein the water connection fitting removably attaches to a male-side hose tap fitting and/or to a female-side faucet tap fitting;
a pressure sensor disposed within the housing and configured to be in fluidic communication with the point of use in the plumbing system;
an electronic microprocessor disposed within the housing and in electrical communication with the pressure sensor;
a power source in electrical communication with the electronic microprocessor;
a data transmission path in electrical communication with the electronic microprocessor;
a control device in electrical communication with the electronic microprocessor through the data transmission path, the control device comprising a visual display and at least one user control configured to control the water pressure sensor assembly;
wherein the water connection fitting comprises only one fluid connection for fluidic communication between the point of use in the plumbing system and the pressure sensor.

21. The water pressure sensor assembly of claim 20, including a temperature sensor disposed within the housing and configured to be in fluidic communication with the point of use in the plumbing system, wherein the temperature sensor is in electrical communication with the electronic microprocessor.

22. The water pressure sensor assembly of claim 20, including a second temperature sensor disposed within the housing and in electrical communication with the electronic microprocessor, the second temperature sensor configured determine the surrounding temperature.

23. The water pressure sensor assembly of claim 20, wherein the housing does not include a fluid valve in fluidic communication with the water connection fitting.

24. A water pressure sensor assembly, comprising:
a water connection fitting attached to a housing, the water connection fitting attachable to a point of use in a plumbing system, wherein the water connection fitting removably attaches to a male-side hose tap fitting and/or to a female-side faucet tap fitting;
a pressure sensor disposed within the housing and configured to be in fluidic communication with the point of use in the plumbing system;
an electronic microprocessor disposed within the housing and in electrical communication with the pressure sensor;
a power source in electrical communication with the electronic microprocessor, wherein the power source comprises an internal battery disposed within the housing;
a data transmission path in electrical communication with the electronic microprocessor;
a control device in electrical communication with the electronic microprocessor through the data transmission path, the control device comprising a visual display and at least one user control configured to control the water pressure sensor assembly, wherein the control device is attached to or integrated into the housing;
wherein the water connection fitting comprises only one fluid connection for fluidic communication between the point of use in the plumbing system and the pressure sensor.

25. The water pressure sensor assembly of claim 24, including a second data transmission path in electrical communication with the electronic microprocessor, wherein the second data transmission path is a wireless transmitter and receiver configured to transmit data from the electronic microprocessor to a wireless smart phone, a wireless tablet or a wireless laptop computer, and wherein the wireless smart phone, the wireless tablet or the wireless laptop computer are configured to install and run a water pressure sensor assembly software which is associated with the water pressure sensor assembly.

26. The water pressure sensor assembly of claim 25, including a temperature sensor disposed within the housing and configured to be in fluidic communication with the point of use in the plumbing system, wherein the temperature sensor is in electrical communication with the electronic microprocessor.

27. The water pressure sensor assembly of claim 25, including a second temperature sensor disposed within the housing and in electrical communication with the electronic microprocessor, the second temperature sensor configured determine the surrounding temperature.

28. The water pressure sensor assembly of claim 24, wherein the housing does not include a fluid valve in fluidic communication with the water connection fitting.

\* \* \* \* \*